(12) United States Patent
Jin et al.

(10) Patent No.: US 12,555,896 B2
(45) Date of Patent: Feb. 17, 2026

(54) TRANSPARENT ANTENNA AND COMMUNICATION SYSTEM

(71) Applicants: Beijing BOE Sensor Technology Co., Ltd., Beijing (CN); BOE Technology Group Co., Ltd., Beijing (CN)

(72) Inventors: Yunnan Jin, Beijing (CN); Zhifeng Zhang, Beijing (CN); He Liu, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 334 days.

(21) Appl. No.: 18/287,725

(22) PCT Filed: Dec. 31, 2021

(86) PCT No.: PCT/CN2021/143473
§ 371 (c)(1),
(2) Date: Oct. 20, 2023

(87) PCT Pub. No.: WO2023/123297
PCT Pub. Date: Jul. 6, 2023

(65) Prior Publication Data
US 2024/0243463 A1    Jul. 18, 2024

(51) Int. Cl.
*H04B 1/40* (2015.01)
*H01Q 1/38* (2006.01)
(52) U.S. Cl.
CPC ............ *H01Q 1/38* (2013.01); *H04B 1/40* (2013.01)
(58) Field of Classification Search
CPC ................................. H01Q 1/38; H04B 1/40
(Continued)

(56) References Cited

U.S. PATENT DOCUMENTS 9,287,612 B2 * 3/2016 Bolin .................. H01Q 9/06
9,698,486 B2 * 7/2017 Shooshtari ............ H01Q 1/521
(Continued)

FOREIGN PATENT DOCUMENTS

CN    102884675 A    1/2013
CN    207353441 U    5/2018
(Continued)

OTHER PUBLICATIONS

Huawei and Hisilicon, "Discussion on possible R17 follow-up study for 5WWC," Written Contribution, Apr. 12, 2019, Contribution S2-1903734, Meeting S2-132, Xi'an, China, <https://www.3gpp.org/dynareport?code=TDocExMtg--S2-132--32862.htm> last visited on Apr. 11, 2024.

*Primary Examiner* — April G Gonzales
(74) *Attorney, Agent, or Firm* — HOUTTEMAN LAW LLC

(57) ABSTRACT

A transparent antenna and a communication system are provided and belong to the field of communication technology. The transparent antenna includes: a dielectric layer including opposite first and second surfaces in a thickness direction thereof; a first conductive layer on the first surface of the dielectric layer and including at least one first feed line and at least one second feed line; and a second conductive layer on the second surface of the dielectric layer and including at least one first opening; an outline of an orthographic projection of each first opening on the dielectric layer intersects with an orthographic projection of each of corresponding first and second feed lines on the dielectric layer, which extends into the orthographic projection of the first opening on the dielectric layer, and the at least one first feed line and the at least one second feed line have different feeding directions.

20 Claims, 13 Drawing Sheets

(58) Field of Classification Search
USPC .................................................... 455/575.7
See application file for complete search history.

(56) References Cited

U.S. PATENT DOCUMENTS

| | | | |
|---|---|---|---|
| 10,340,609 B2 * | 7/2019 | Kosaka | H01Q 5/42 |
| 10,505,285 B2 * | 12/2019 | Kao | H01Q 5/42 |
| 10,658,762 B2 * | 5/2020 | Paulotto | H01Q 5/40 |
| 10,741,909 B2 * | 8/2020 | Rajagopalan | H01Q 5/35 |
| 2016/0278205 A1 * | 9/2016 | Bae | H05K 3/04 |
| 2017/0229496 A1 * | 8/2017 | Velichko | H10F 39/014 |
| 2020/0251510 A1 * | 8/2020 | Ge | H10F 39/199 |
| 2020/0335869 A1 * | 10/2020 | Jia | H01Q 9/0457 |
| 2023/0422409 A1 * | 12/2023 | Kim | H01Q 1/243 |
| 2024/0014572 A1 * | 1/2024 | Chen | H01Q 21/08 |

FOREIGN PATENT DOCUMENTS

| | | | |
|---|---|---|---|
| CN | 108258424 A | 7/2018 | |
| CN | 110247152 A | 9/2019 | |
| CN | 111029773 A | 4/2020 | |
| CN | 112368884 A | 2/2021 | |
| CN | 112751155 A | 5/2021 | |
| CN | 112993580 A | 6/2021 | |
| CN | 213845498 U | 7/2021 | |
| CN | 113540781 A | 10/2021 | |

\* cited by examiner

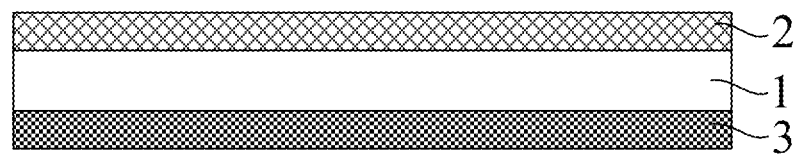
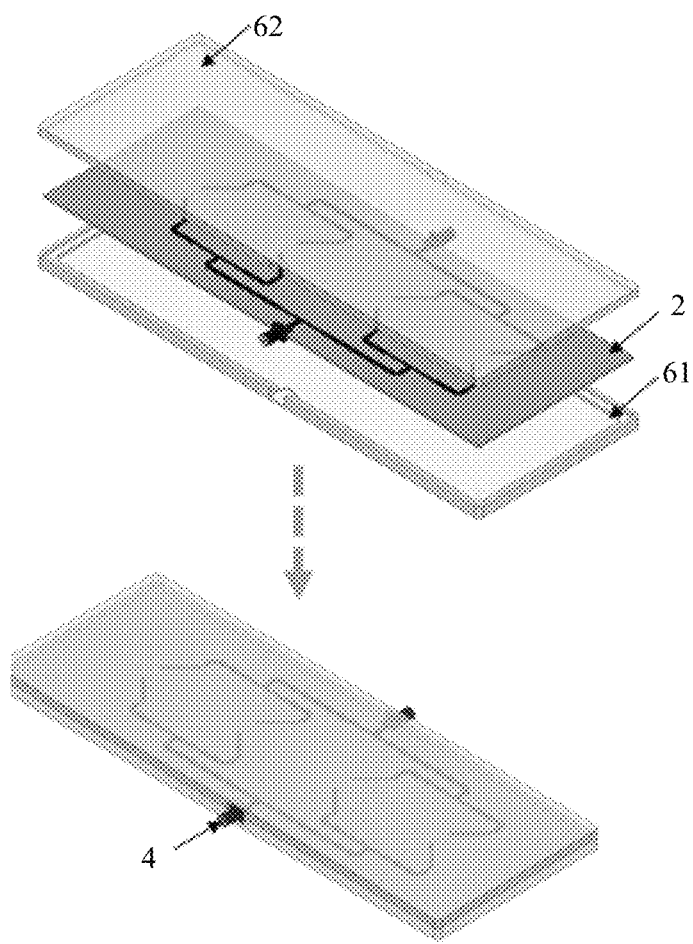
FIG. 1
FIG. 2

TRANSPARENT ANTENNA AND COMMUNICATION SYSTEM

TECHNICAL FIELD

The present disclosure relates to the field of communication technology, and in particular to a transparent antenna and a communication system.

BACKGROUND

The 5G CPE (Customer Premise Equipment) is a 5G customer terminal equipment, which is actually a conversion equipment capable of converting a 5G signal to a Wi-Fi signal. Particularly, the 5G CPE receives a 5G mobile communication signal sent by an outdoor base station, converts it into an indoor Wi-Fi signal, and finally is accessible to a mobile terminal for use. A conventional 5G CPE antenna adopts a ±45° dual-polarized dipole antenna. In order to improve a radiation gain of the dipole antenna, a radiation unit is required to be separated from a back surface of the dipole antenna by a distance of a quarter of a wavelength, to achieve good reflective characteristics. Therefore, a height of the conventional dipole antenna as a receiving antenna of the 5G CPE is generally greater, which results in an increase of an overall size of the CPE. However, at present, a mobile communication device is increasingly required to be miniaturized, so that it is necessarily a major development difficulty to reduce the height of the antenna.

SUMMARY

The present invention is directed to at least one of the technical problems of the prior art, and provides a transparent antenna and a communication system.

In a first aspect, an embodiment of the present disclosure provides a transparent antenna, including: a dielectric layer including a first surface and a second surface opposite to each other in a thickness direction of the dielectric layer; a first conductive layer on the first surface of the dielectric layer; wherein the first conductive layer includes at least one first feed line and at least one second feed line; and a second conductive layer on the second surface of the dielectric layer; wherein the second conductive layer includes at least one first opening; wherein an outline of an orthographic projection of each first opening on the dielectric layer intersects with an orthographic projection of each of a corresponding first feed line and a corresponding second feed line on the dielectric layer; and the orthographic projection of each of the first feed line and the second feed line on the dielectric layer extends into the orthographic projection of the corresponding first opening on the dielectric layer, and the at least one first feed line has a different feeding direction from the at least one second feed line.

In some embodiments, at least one of the first conductive layer and the second conductive layer includes a metal mesh structure.

In some embodiments, the at least one first opening includes a plurality of first openings, the at least one first feed line includes a plurality of first feed lines, the at least one second feed line includes a plurality of second feed lines, and the plurality of first feed lines and the plurality of second feed lines are in one-to-one correspondence with the plurality of first openings, respectively; centers of the plurality of first openings are on a straight line, and a line connecting the centers of the plurality of first openings is a first line segment; and the at least one first feed line and the at least one second feed line are symmetrically arranged with an extending line of the first line segment as a symmetry axis.

In some embodiments, each first opening has a parallelogram in outline; an intersection between the orthographic projections of the first feed line and the first opening corresponding to each other on the dielectric layer is a first intersection, and an intersection of the orthographic projections of the second feed line and the first opening corresponding to each other on the dielectric layer is a second intersection; and for an orthographic projection of any first opening on the dielectric layer, a connecting line between the first intersection and the second intersection is parallel to a diagonal line of the first opening.

In some embodiments, the connecting line between the first intersection and the second intersection is a second line segment; and a ratio of a length of the second line segment to a length of the diagonal line of the first opening parallel to the second line segment is in a range of 0.4 to 0.9.

In some embodiments, a portion of an orthographic projection of each of the first feed line and the second feed line on the dielectric layer, within the orthographic projection of the corresponding first opening on the dielectric layer, has a line length of $¼\lambda$.

In some embodiments, at least one of the first feed line and the second feed line is a micro-strip line, and a feeding direction of one of the first feed line and the second feed line is a vertical direction, and a feeding direction of the other one of the first feed line and the second feed line is a horizontal direction.

In some embodiments, the transparent antenna further includes: a first feed structure and a second feed structure both on the second surface of the dielectric layer, wherein the first feed structure is electrically connected to the at least one first feed line, and the second feed structure is electrically connected to the at least one second feed line.

In some embodiments, the transparent antenna further includes: a first feed structure and a second feed structure both in the first conductive layer, wherein the first feed structure is electrically connected to the at least one first feed line, and the second feed structure is electrically connected to the at least one second feed line.

In some embodiments, the at least one first opening includes $2^n$ first openings, the first feed structure includes n stages of third feed lines, the second feed structure includes n stages of fourth feed lines; one third feed line at a $1^{st}$ stage is connected to two adjacent first feed lines, and different third feed lines at the $1^{st}$ stage are connected to different first feed lines; one third feed line at an $m^{th}$ stage is connected to two adjacent third feed lines at an $(m-1)^{th}$ stage, and different third feed lines at the $m^{th}$ stage are connected to different third feed lines at the $(m-1)^{th}$ stage; one fourth feed line at a $1^{st}$ stage is connected to two adjacent second feed lines, and different fourth feed lines at the $1^{st}$ stage are connected to different second feed lines; one fourth feed line at an $m^{th}$ stage is connected to two adjacent fourth feed lines at an $(m-1)^{th}$ stage, and different fourth feed lines at the $m^{th}$ stage are connected to different fourth feed lines at the $(m-1)^{th}$ stage; where $n \geq 2$, $2 \leq m \leq n$, and both m and n are integers; and at least one of the third feed line and the fourth feed line is a micro-strip line.

In some embodiments, the transparent antenna further includes: a first connector and a second connector; wherein the first connector is electrically connected to an $n^{th}$ stage of the third feed lines; and the second connector is electrically connected to an $n^{th}$ stage of the fourth feed lines.

In some embodiments, the dielectric layer is a single layer structure and is made of polyimide or polyethylene terephthalate.

In some embodiments, the dielectric layer includes a first dielectric sub-layer, a first adhesive layer and a second dielectric sub-layer, which are stacked together; and the first conductive layer is on a side of the first dielectric sub-layer away from the first adhesive layer; and the second conductive layer is on a side of the second dielectric sub-layer away from the first adhesive layer.

In some embodiments, a material of the first dielectric sub-layer and/or the second dielectric sub-layer includes polyimide or polyethylene terephthalate.

In some embodiments, the dielectric layer includes a first dielectric sub-layer, a first adhesive layer, a support layer, a second adhesive layer, and a second dielectric sub-layer, which are stacked together; the first conductive layer is on a side of the first dielectric sub-layer away from the first adhesive layer; the second conductive layer is arranged on a side of the second dielectric sub-layer away from the second adhesive layer.

In some embodiments, a material of the support layer includes any one of polycarbonate plastic, cycloolefin polymer plastic, or acrylic/polymethyl methacrylate.

In some embodiments, a material of the first dielectric sub-layer and/or the second dielectric sub-layer includes polyimide or polyethylene terephthalate.

In some embodiments, the transparent antenna further includes a housing; wherein the dielectric layer is arranged within a hollow space of the housing.

In a second aspect, an embodiment of the present disclosure provides a communication system, which includes the transparent antenna of any one of the above embodiments.

In some embodiments, the communication system further includes: a transceiver unit configured to transmit or receive a signal; a radio frequency transceiver connected to the transceiver unit and configured to modulate the signal transmitted by the transceiver unit or demodulate a signal received by the transparent antenna and then transmit the signal to the transceiver unit; a signal amplifier connected to the radio frequency transceiver and configured to improve a signal-to-noise ratio of the signal transmitted by the radio frequency transceiver or the signal received by the transparent antenna; a power amplifier connected to the radio frequency transceiver and configured to amplify a power of the signal transmitted by the radio frequency transceiver or the signal received by the transparent antenna; and a filtering unit connected to the signal amplifier, the power amplifier and the transparent antenna, and configured to filter a received signal and then transmit the filtered signal to the transparent antenna or filter the signal received by the transparent antenna.

BRIEF DESCRIPTION OF DRAWINGS

FIG. 1 is a cross-sectional view of a transparent antenna according to an embodiment of the present disclosure.

FIG. 2 is an assembly view of a transparent antenna according to an embodiment of the present disclosure.

DETAIL DESCRIPTION OF EMBODIMENTS

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 3:
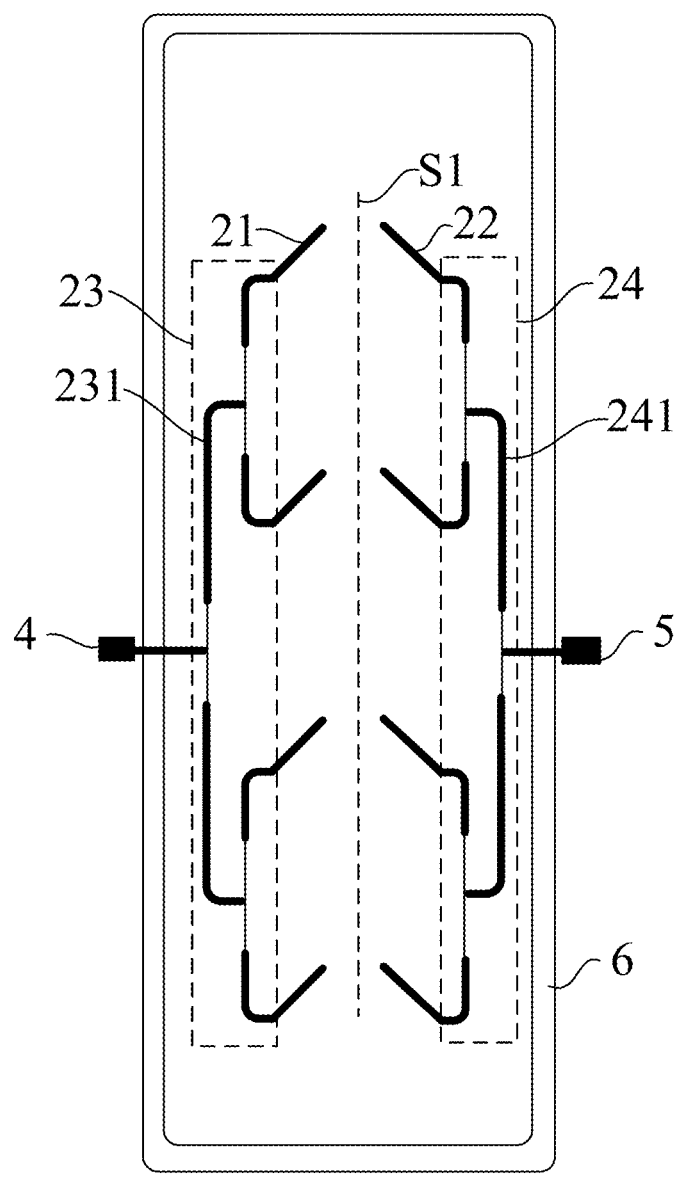
FIG. 3 is a top view (front) of a transparent antenna at a first viewing angle according to an embodiment of the present disclosure.
Figure 4:
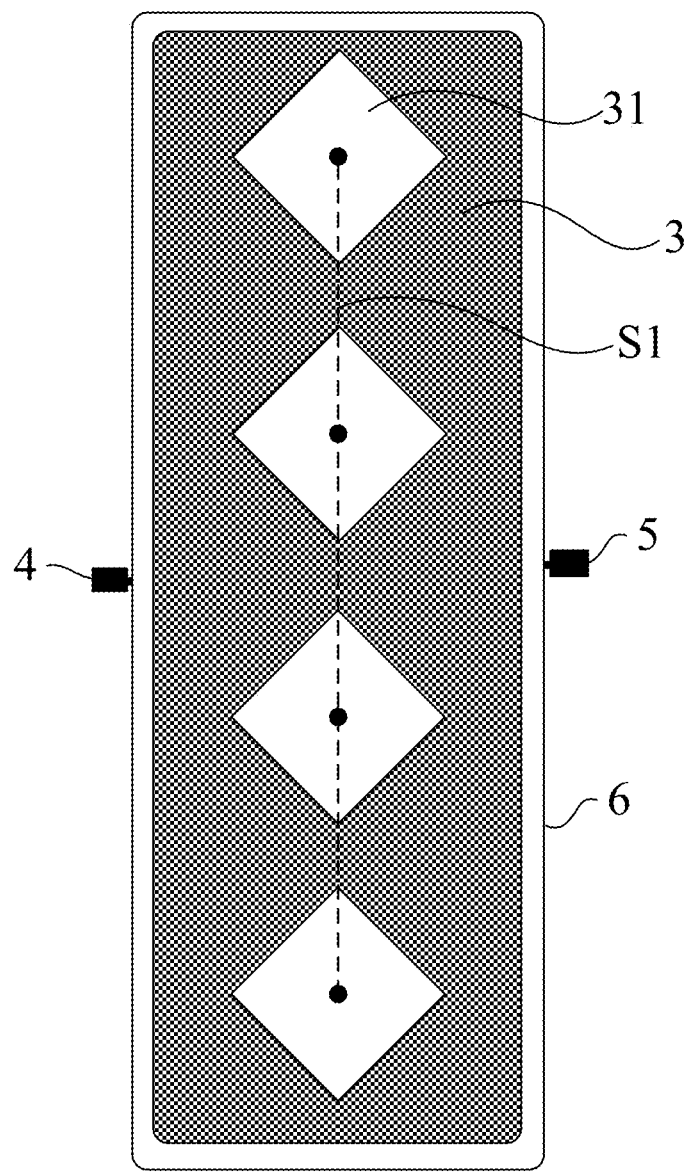
FIG. 4 is a top view (back) of a transparent antenna at a second viewing angle according to an embodiment of the present disclosure.

In a first aspect, FIG. 1 is a cross-sectional view of a transparent antenna according to an embodiment of the present disclosure. FIG. 2 is an assembly view of a transparent antenna according to an embodiment of the present disclosure. FIG. 3 is a top view (front) of a transparent antenna at a first viewing angle according to an embodiment of the present disclosure. FIG. 4 is a top view (back) of a transparent antenna at a second viewing angle according to an embodiment of the present disclosure. As shown in FIGS. 1 to 4, an embodiment of the present disclosure provides a transparent antenna, which includes a dielectric layer 1, a first conductive layer 2, and a second conductive layer 3. The dielectric layer 1 includes a first surface and a second surface which are oppositely arranged along a thickness direction of the dielectric layer 1; the first conductive layer 2 is disposed on the first surface of the dielectric layer 1 and the second conductive layer 3 is disposed on the second surface of the dielectric layer 1.

Specifically, the first conductive layer 2 includes at least one first feed line 21 and at least one second feed line 22, and the at least one first feed line 21 and the at least one second feed line 22 have different feeding directions. The second electrode layer is provided with at least one first opening 31 therein. An outline of an orthographic projection of any first opening 31 on the dielectric layer 1 intersects with an orthographic projection of each of one first feed line 21 and one second feed line 22 on the dielectric layer 1. For example: when the at least one first opening 31 includes a plurality of first openings 31, the first openings 31 are in one-to-one correspondence with the first feed lines 21 and the second feed lines 22, that is, the numbers of the first openings 31, the first feed lines 21, and the second feed lines 22 are the same. Also in an embodiment of the present disclosure, the orthographic projection of each of the first feed line 21 and the second feed line 22 on the dielectric layer 1 intersects with the outline of the orthographic projection of the corresponding first opening 31 on the dielectric layer 1, and extends into the orthographic projection of the corresponding first opening 31 on the dielectric layer 1. It should be noted that the second electrode layer may be a ground electrode layer, that is, a potential written in the second electrode layer is a ground potential.

In an embodiment of the present disclosure, the at least one first feed line 21 and the at least one second feed line 22 have different feeding directions. For example: the feeding direction of one of the first and second feed lines 21 and 22 is a vertical direction, and the feeding direction of the other one of the first and second feed lines 21 and 22 is a horizontal direction. It should be noted that the feeding direction of the first feed line 21 is a direction for exciting and feeding an input terminal for a first microwave signal (the feeding direction of the first feed line 21 is a direction in which a first microwave signal is excited and fed into an input terminal); the feeding direction of the second feed line 22 is a direction for exciting and feeding an input terminal for a second microwave signal. It is understood that the horizontal direction and the vertical direction are relative concepts, that is, when the feeding direction of the first feed line 21 is the vertical direction, the feeding direction of the second feed line 22 is the horizontal direction, and vice versa.

In the transparent antenna of the present disclosure, a first feed line 21 and a second feed line 22 are correspondingly disposed in each first opening 31 in the second electrode layer for transmitting microwaves, and have different feeding directions, so that the transparent antenna according to the embodiment of the present disclosure is a dual-polarized antenna.

In some examples, as shown in FIG. 1, the dielectric layer 1 of the transparent antenna according to the embodiment of the present disclosure may have a single-layer structure, and a material of the dielectric layer 1 may be a flexible material or a hard material. For example: the material of the dielectric layer 1 includes, but is not limited to, polyethylene terephthalate (PET), polyimide (PI), polycarbonate (PC) plastic, copolymers of cycloolefin (COP), or polymethyl methacrylate (PMMA). Further, the first conductive layer 2 is disposed on the first surface (upper surface) of the dielectric layer 1, the second conductive layer 3 is disposed on the second surface (lower surface) of the dielectric layer 1, and a protective layer may be disposed on a surface of the first conductive layer 2 away from the dielectric layer 1, for example: the protective layer may be a transparent waterproof coating with self-repairing capability. Alternatively, a protective layer may also be disposed on the surface of the second conductive layer 3 away from the dielectric layer 1, and may be made of the same material as the protective layer disposed on the surface of the first conductive layer 2 away from the dielectric layer 1, so that repeated descriptions are omitted here.

Figure 6:
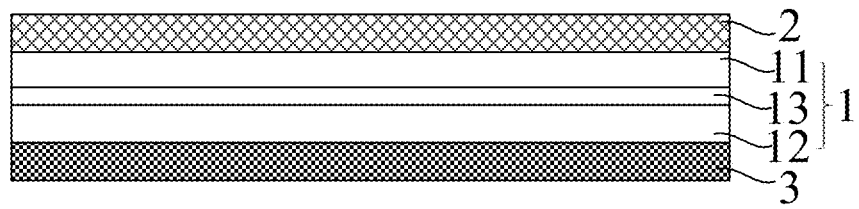
FIG. 6 is another cross-sectional view of a transparent antenna according to an embodiment of the present disclosure.

In some examples, FIG. 6 is another cross-sectional view of a transparent antenna according to an embodiment of the present disclosure. As shown in FIG. 6, the dielectric layer 1 of the transparent antenna according to the embodiment of the present disclosure may be a composite layer, which includes a first dielectric sub-layer 11, a first adhesive layer 13, and a second dielectric sub-layer 12 that are stacked. A surface of the first dielectric sub-layer 11 away from the first adhesive layer 13 is used as the first surface of the dielectric layer 1, that is, the first conductive layer 2 is disposed on the surface of the first dielectric sub-layer 11 away from the first adhesive layer 13. A surface of the second dielectric sub-layer 12 away from the first adhesive layer 13 is used as the second surface of the dielectric layer 1, that is, the second conductive layer 3 is disposed on the surface of the second dielectric sub-layer 12 away from the first adhesive layer 13. Further, like the above example, protective layers may be disposed on both surfaces of the first conductive layer 2 and the second conductive layer 3 away from the first adhesive layer 13, and details are not repeated here. In some examples, a material of each of the first dielectric sub-layer 11 and the second dielectric sub-layer 12 includes, but is not limited to, polyimide (PI) or polyethylene terephthalate (PET). A material of the first adhesive layer 13 may be an optical clear adhesive (OCA).

Figure 7:
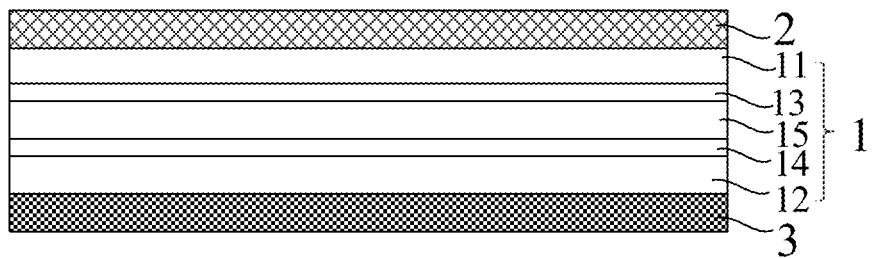
FIG. 7 is yet another cross-sectional view of a transparent antenna according to an embodiment of the present disclosure.

In some examples, FIG. 7 is yet another cross-sectional view of a transparent antenna according to an embodiment of the present disclosure. As shown in FIG. 7, the dielectric layer 1 of the transparent antenna according to the embodiment of the present disclosure may also adopt a composite layer, which includes a first dielectric sub-layer 11, a first adhesive layer 13, a support layer 15, a second adhesive layer 14, and a second dielectric sub-layer 12 that are stacked. A surface of the first dielectric sub-layer 11 away from the first adhesive layer 13 is used as the first surface of the dielectric layer 1, that is, the first conductive layer 2 is disposed on the surface of the first dielectric sub-layer 11 away from the first adhesive layer 13. A surface of the second dielectric sub-layer 12 away from the second adhesive layer 14 is used as the second surface of the dielectric layer 1, that is, the second conductive layer 3 is disposed on the surface of the second dielectric sub-layer 12 away from the second adhesive layer 14. Further, like the above example, protective layers may be disposed on both surfaces of the first conductive layer 2 and the second conductive layer 3 away from the first adhesive layer 13, and details are not repeated here. In some examples, a material of each of the first dielectric sub-layer 11 and the second dielectric sub-layer 12 includes, but is not limited to, polyimide (PI) or polyethylene terephthalate (PET). A material of each of the first adhesive layer 13 and the second adhesive layer 14 may be an optical clear adhesive (OCA). A material of the support layer 15 includes, but is not limited to, polycarbonate (PC) plastic, copolymers of cycloolefin (COP), or polymethyl methacrylate (PMMA) or the like.

Figure 5:
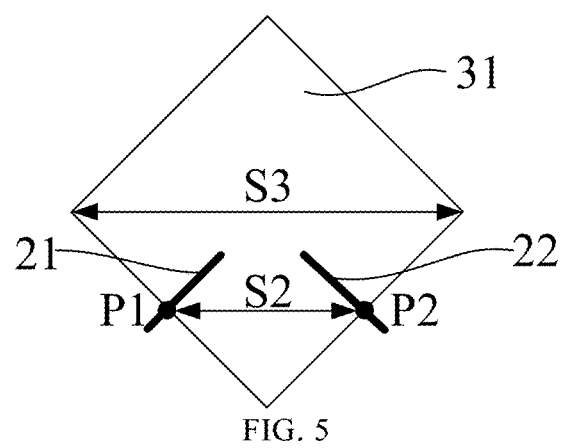
FIG. 5 is a schematic diagram illustrating a positional relationship between a first feed line and a second feed line and a corresponding first opening in a transparent antenna according to an embodiment of the present disclosure.

In some examples, FIG. 5 is a schematic diagram of a positional relationship between a first feed line 21 and a second feed line 22 and a corresponding first opening 31 in a transparent antenna according to an embodiment of the present disclosure. As shown in FIG. 5, in order to improve the radiation efficiency of the transparent antenna, in the embodiment of the present disclosure, a positional relationship among the first feed line 21, the second feed line 22, and the first opening 31 corresponding to each other is designed. Specifically, a plurality of the first openings 31 are included, and the plurality of first feed lines 21 and the plurality of second feed lines 22 are all in one-to-one correspondence with the plurality of first openings 31; centers of the plurality of first openings 31 are on a straight line, and a line connecting the centers of the plurality of first openings 31 is a first line segment S1; the plurality of first feed lines 21 and the plurality of second feed lines 22 are symmetrically arranged with an extending direction of the first line segment S1 as a symmetry axis. With this arrangement, not only wiring is facilitated and a size of the transparent antenna is reduced, but also a difference between polarization directions of the first microwave signal transmitted by the first feed lines 21 and the microwave signal transmitted by the second feed lines 22 are 90°, for example: the polarization direction for the first feed line 21 is 0°, the polarization direction for the second feed line 22 is 90°; for another example: the polarization direction for the first feed line 21 is +45°, the polarization direction for the second feed line 22 is −45°, etc.

In some examples, for the first opening 31, the first feed line 21 and the second feed line 22 corresponding to each other, a portion of the first feed line 21 whose an orthographic projection on the dielectric layer 1 is located within an orthographic projection of the first opening 31 on the dielectric layer 1 has a line length of ¼λ, and a portion of the second feed line 22 whose an orthographic projection on the dielectric layer 1 is located within the orthographic projection of the first opening 31 on the dielectric layer 1 has a line length of ¼λ. It should be noted that the line length of the portion of the first feed line 21 whose the orthographic projection on the dielectric layer 1 is located within the orthographic projection of the first opening 31 on the dielectric layer 1 and the line length of the portion of the second feed line 22 whose the orthographic projection on the dielectric layer 1 is located within the orthographic projection of the first opening 31 on the dielectric layer 1 are designed for impedance matching, so as to better transmit the microwave signal, improve the transmission efficiency of the microwave signal, and reduce the transmission loss.

In some examples, a shape of an outline of each first opening 31 in the second conductive layer 3 may be a parallelogram, a circle, an ellipse, a triangle, or the like. In the embodiment of the present disclosure, the shape of the outline of the first opening 31 is not limited. In the following description, the outline of the first opening 31 is a parallelogram, specifically, a square, as an example. For the first opening 31, the first feed line 21 and the second feed line 22 corresponding to each other, as an example, an intersection between orthographic projections of the first feed line 21 and the first opening 31 on the dielectric layer 1 is a first intersection, and an intersection between orthographic projections of the second feed line 22 and the first opening 31 on the dielectric layer 1 is a second intersection; for the orthographic projection of any first opening 31 on the dielectric layer 1, a connecting line between the first intersection and the second intersection is parallel to one diagonal line of the first opening 31. It should be noted that the first feed line 21 and the second feed line 22 are both linear micro-strip lines. With this arrangement, a dual-polarized antenna with the 90° difference in polarization directions can be realized. Further, the connecting line between the first intersection and the second intersection is a second line segment S2; a ratio of a length of the second line segment S2 to a length of a diagonal line of the first opening 31 parallel to the second line segment S2 is S2:S3 in a range of 0.4 to 0.9, for example: S2:S3=0.6. A distance between the first feed line 21 and the second feed line 22 depends on the length of the second line segment S2. The distance between the first feed line 21 and the second feed line 22 can be provided reasonably, so that the isolation between the first feed line 21 and the second feed line 22 can be improved, and the interference of signal transmission can be avoided.

In some examples, in addition to the above structure, in the present disclosure, a first feed structure 23 and a second feed structure 24 are included. The first feed structure 23 and the second feed structure 24 are both located on the second surface of the dielectric layer 1, and the first feed structure 23 is electrically connected to the first feed lines 21 and configured to be fed through the first feed lines 21. The second feed structure 24 is electrically connected to the second feed lines 22 and is configured to be fed through the second feed lines 22.

Further, the first conductive layer 2 includes the first feed structure 23 and the second feed structure 24, that is, the first feed structure 23, the second feed structure 24, the first feed lines 21 and the second feed lines 22 are disposed in the same layer, which is beneficial to the light weight and the thinness of the transparent antenna, so that the antenna is easy to manufacture. Meanwhile, since the first feed structure 23, the second feed structure 24, the first feed lines 21 and the second feed lines 22 are disposed in the same layer, the first feed structure 23 and the first feed lines 21 may have a one-piece structure, and the second feed structure 24 and the second feed lines 22 may have a one-piece structure. Alternatively, the first feed structure 23 and the first feed lines 21 may be disposed in different layers. In this case, the first feed structure 23 and the first feed lines 21 may be configured to feed in a coupling manner; similarly, the second feed structure 24 and the second feed lines 22 may be disposed in different layers, and correspondingly, the second feed structure 24 and the second feed lines 22 may be configured to feed in a coupling manner.

In some examples, referring to FIG. 4, when $2^n$ first openings 31 in the second electrode layer are included, $2^n$ radiating structures are included, and the first feed structure 23 includes n stages of third feed lines 231, and the second feed structure 24 includes n stages of fourth feed lines 241. At least one of the third feed line 231 and the fourth feed line 241 is a micro-strip line. In the embodiment of the present disclosure, as an example, both the third feed line 231 and the fourth feed line 241 are the micro-strip lines. Specifically, one third feed line 231 located at the 1st stage is connected to two adjacent first feed lines 21, and different third feed lines 231 located at the 1st stage are connected to different first feed lines 21; one third feed line 231 located at the m-th stage is connected to two adjacent third feed lines 231 located at the (m−1)th stage, and different third feed lines 231 located at the m-th stage are connected to different third feed lines 231 located at the (m−1)th stage; one fourth feed line 241 located at the 1st stage is connected to two adjacent second feed lines 22, and different fourth feed lines 241 located at the 1st stage are connected to different second feed lines 22; one fourth feed line 241 located at the m-th stage is connected to two adjacent fourth feed lines 241 located at the (m−1)th stage, and different fourth feed lines 241 located at the m-th stage are connected to different fourth feed lines 241 located at the (m−1)th stage; where n≥2, 2≤m≤n, and both m and n are integers.

It should be noted that in the first feed structure 23, an end of the third feed line 231 located at the 1st stage connected to the first feed line 21 serves as a second feed port of the first feed structure 23, and an end of the third feed line 231 located at the nth stage not connected to the third feed line 231 located at the (n−1)th stage serves as a first feed port of the first feed structure 23. In the second feed structure 24, an end of the fourth feed line 241 at the 1st stage connected to the second feed line 22 serves as a second feed port of the first feed structure 23, and an end of the fourth feed line 241 at the nth stage not connected to the fourth feed line 241 at the (n−1)th stage serves as a first feed port of the second feed structure 24.

For example: by taking the transparent antenna shown in FIGS. 2 to 4 as an example, the second electrode layer of the transparent antenna includes 4 first openings 31, that is, n=2, and the first feed structure 23 employs a one-to-two, two-to-four (i.e., two-stage) structure, including three third feed lines 231; the second feed structure 24 employs a one-to-two, two-to-four (i.e., two-stage) structure, including three fourth feed lines 241. One third feed line 231 at the 1st stage is connected to feed ends of 1st and 2nd first feed lines 21 in an up-to-down direction, and the other third feed line 231 is connected to feed ends of 3rd and 4th first feed lines 21 in the up-to-down direction; the third feed line 231 at the 2nd stage is connected to the feed ends of the two third feed lines 231 at the 1st stage. Similarly, one fourth feed 241 located at the 1st stage is connected to feed ends of 1st and 2nd second feeds 22 in an up-to-down direction, and the other fourth feed 241 is connected to feed ends of 3rd and 4th second feeds 22 in the up-to-down direction; the fourth feed line 241 at the 2nd stage is connected to the feed ends of the two fourth feed lines 241 at the 1st stage.

In some examples, widths of the first and second feed lines 21, 22 are equal or substantially equal to each other; widths of the third and fourth feed lines 231 and 241 are equal or substantially equal to each other. It should be noted that the term "substantially equal" in the embodiment of the present disclosure means that a difference between two items is within a preset range, for example: a difference between the widths of the first and second feed lines 21 and 22 is not greater than 0.1 mm, the widths of the first and second feed lines 21 and 22 are considered to be substantially equal to each other. Further, a ratio of the widths of the first feed 21 (or the second feed 22) to the third feed 231 (or the fourth feed 241) is in a range from 0.2 to 0.5; for example: the width of each of the first feed line 21 and the second feed line 22 is about 0.6 mm; the width of each of the third feed line 231 and the fourth feed line 241 is 1.5 mm; the ratio of the widths of the first feed line 21 to the third feed line 231 is 0.6:1.5=0.4. Usually, the first feed line 21, the second feed line 22, the third feed line 231 and the fourth feed line 241 are arranged in the same layer and made of the same material, and the ratio of the widths of the first feed line 21 to the third feed line 231 is reasonably set to realize an impedance matching.

In some examples, the first conductive layer 2 and the second conductive layer 3 may each employ a metal mesh structure. That is, the first feed line 21, the second feed line 22, the third feed line 231, the fourth feed line 241 and the second conductive layer 3 may each adopt a metal mesh structure. When the first feed line 21, the second feed line 22, the third feed line 231, the fourth feed line 241 and the second conductive layer 3 each employs a metal mesh structure, orthographic projections of hollow parts of the metal mesh structures of the respective layers on the dielectric layer 1 completely or substantially overlap with each other. It should be noted that the term "substantially overlap" in the embodiment of the present disclosure means that a width of a staggered area of the orthographic projections of the hollow parts of the metal mesh structures of the two layers is not greater than 1 time of the line width. With this arrangement, the light transmittance of the antenna can be effectively improved.

Further, the hollow part of the metal mesh structure may be triangular, rhombic, square or the like. The first conductive layer 2 and the second conductive layer 3 both are of the metal mesh structure, and orthographic projections of hollow parts of the first conductive layer and the second conductive layer on the dielectric layer 1 overlap with each other. With this arrangement, the light transmittance of the transparent antenna can be effectively improved. In the embodiment of the present disclosure, the light transmittance of the metal mesh structure of each layer is about in a range from 70% to 88%.

Figure 8:
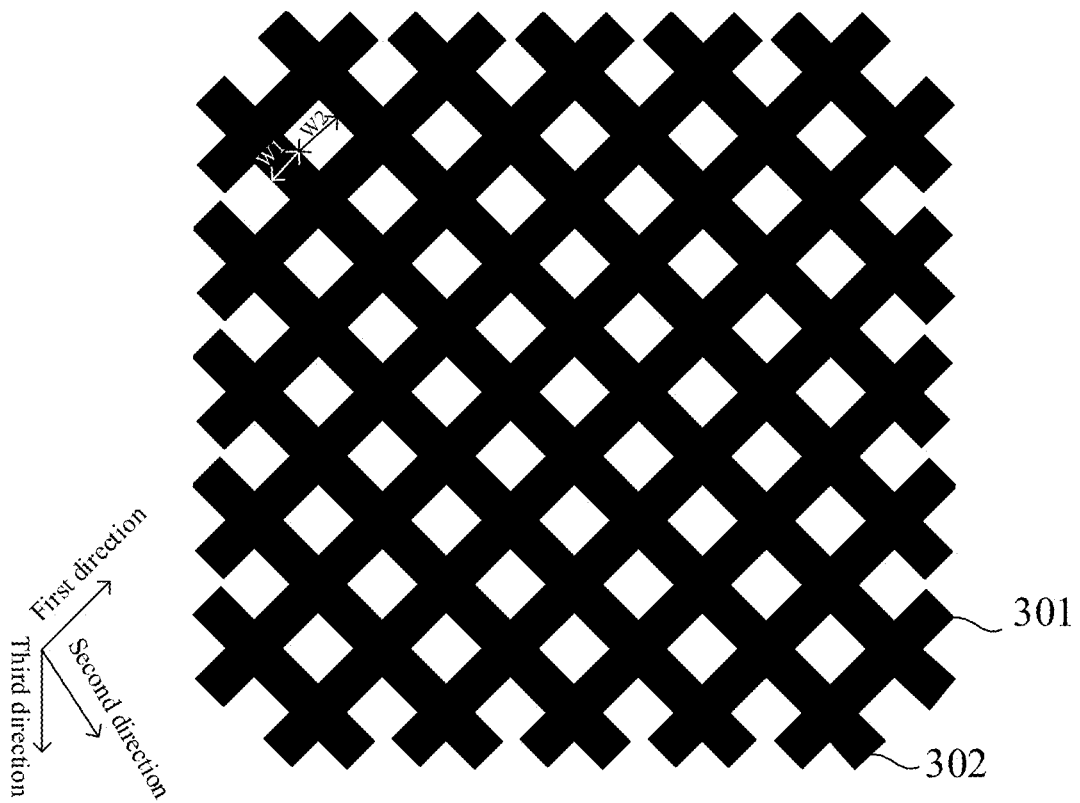
FIG. 8 is a schematic diagram of a part of a metal mesh in a transparent antenna according to an embodiment of the present disclosure.

In one example, FIG. 8 is a partial schematic diagram of a metal mesh in a transparent antenna according to an embodiment of the present disclosure. As shown in FIG. 8, the metal mesh structure may include a plurality of first metal lines and a plurality of second metal lines crossing with the plurality of first metal lines. For example: extending directions of the plurality of first metal lines and the plurality of second metal lines may be perpendicular to each other, so that square or rectangular hollow parts are formed. Alternatively, the extending directions of the plurality of first metal lines and the plurality of second metal lines of the metal mesh may be arranged non-perpendicularly. For example: an angle between the extending directions of the plurality of first metal lines and the plurality of second metal lines is 45°, so that rhombic hollow parts are formed. In some examples, line widths, line thicknesses, and line spacing of the first metal lines and the second metal lines of the metal mesh structure are preferably the same, respectively, but may be different from each other. For example: the line width W1 of each of the first metal lines and the second metal lines is about in a range from 1 μm to 30 μm, and the line spacing W2 is about in a range from 50 μm to 250 μm; the line thickness is about in a range from 0.5 μm to 10 μm. The metal mesh structure in the embodiment of the present disclosure may be formed on the dielectric layer 1 through processes including, but not limited to, an imprinting process or an etching process.

In some examples, ends of the first metal lines and the second metal lines of the metal mesh structure may be connected together, that is, a periphery of the metal mesh structure is a closed loop structure. In an actual product, the ends of the first metal lines and the second metal lines of the metal mesh structure may also be disconnected from each other, i.e. the periphery of the metal mesh structure is radial.

In some examples, the first feed port of the first feed structure 23 is connected to a first connection electrode as a first feed end; the first feed port of the second feed structure 24 is connected to a second connection electrode as a second feed end. In one example, a material of the first connection electrode and the second connection electrode includes, but is not limited to, copper, and alternatively, aluminum, silver, or other metal material. In the embodiment of the present disclosure, the connection electrodes are preferably made of copper, so that the insertion loss of the radio frequency signal can be effectively reduced.

Further, referring to FIGS. 2 to 4, in addition to the above structure, the transparent antenna further includes a first connector 4 and a second connector 5, which may have the same structure. The first connector 4 is electrically connected to the first feed structure 23. For example: the first connector 4 is electrically connected to the first feed port of the first feed structure 23, specifically, may be directly connected to the first connection electrode. The second connector 5 is electrically connected to the second feed structure 24. For example: the second connector 5 is electrically connected to the first feed port of the second feed structure 24, specifically, may be directly connected to the second connection electrode. Further, the first connector 4 and the second connector 5 include, but are not limited to, SMA (Small A Type) connectors.

In some examples, in addition to the above structure, the transparent antenna in the embodiments of the present disclosure may further include a housing 6, the dielectric layer 1 is disposed in a hollow space of the housing 6. It will be appreciated that since the first and second conductive layers 2 and 3 are provided on the first and second surfaces of the dielectric layer 1, respectively, the dielectric layer 1 is provided within the housing 6, and correspondingly, the first and second conductive layers 2 and 3 are also located within the housing 6. For example: the housing 6 includes a first accommodating portion 61 and a second accommodating portion 62 which are oppositely arranged, and a first notch and a second notch are respectively formed in two opposite side walls of the first accommodating portion 61 or the second accommodating portion 62, and at positions respectively corresponding to the first connector 4 and the second connector 5. The first accommodating portion 61 is provided with the first notch and the second notch as an example, when the dielectric layer 1 is disposed in the first accommodating portion 61, the first connector 4 is clamped at the first notch, and the second connector 5 is clamped at the second notch. The first accommodating portion 61 and the second accommodating portion 62 may be fixed by a screw manner. For example: screw holes are provided at corners of side walls of the first accommodating portion 61 and the second accommodating portion 62, and screws are fastened in the screw holes to fixedly connect the first accommodating portion 61 and the second accommodating portion 62.

Further, a material of the housing 6 of the transparent antenna may include plastic, such as: polycarbonate plastic, copolymers of cycloolefin plastic, or polymethyl methacrylate, or the like. When the housing 6 is fixed with a glass window, the housing may be adhered to the glass window by glue.

In some examples, a material of each of the first conductive layer 2 and the second conductive layer 3 in the embodiments of the present disclosure includes, but is not limited to, a metal material such as copper, silver, aluminum, and the like, which is not limited in the embodiments of the present disclosure.

In order to make clearer the structure and effect of the transparent antenna of an embodiment of the present disclosure, a specific structure of the transparent antenna is given below.

Referring to FIGS. 2 to 4 and 6, the transparent antenna has a size in a range from about 240 mm×80 mm×8 mm to 280 mm×100 mm×12 mm, such as 254 mm×92.8 mm×10 mm (3.175$\lambda_c$% 1.16$\lambda_c$×0.125$\Delta_c$; $\lambda_c$ is a wavelength of a center frequency point). The transparent antenna includes the dielectric layer 1, the first conductive layer 2 arranged on the first surface of the dielectric layer 1, the second conductive layer 3 arranged on the second surface of the dielectric layer 1 and the housing 6. The dielectric layer 1 includes the first dielectric sub-layer 11, the first adhesive layer 13, the support layer 15, the second adhesive layer 14 and the second dielectric sub-layer 12. The first conductive layer 2 is arranged on a side of the first dielectric sub-layer 11 away from the first adhesive layer 13 and includes the first feed structure 23, the second feed structure 24, the first feed lines 21 and the second feed lines 22. The second conductive layer 3 is disposed on a side of the second dielectric sub-layer 12 away from the second adhesive layer 14, and has the plurality of first openings 31. A distance between the first openings 31 is in a range from about 45 mm to 65 mm, and when the size of the transparent antenna is 254 mm×92.8 mm×10 mm, the distance between the first openings 31 may be set to 55 mm (0.69$\lambda_c$). The shapes, materials, etc. of the first dielectric sub-layer 11, the first adhesive layer 13, the support layer 15, the second adhesive layer 14, the second dielectric sub-layer 12, the first feed structure 23, the second feed structure 24, the first feed lines 21, the second feed lines 22, the second conductive layer 3, and the housing 6 are the same as those described above, and are not described herein again. An operating frequency of the transparent antenna is an N77 wave band (in a range from 3.3 GHz to 4.2 GHz).

Figure 9:
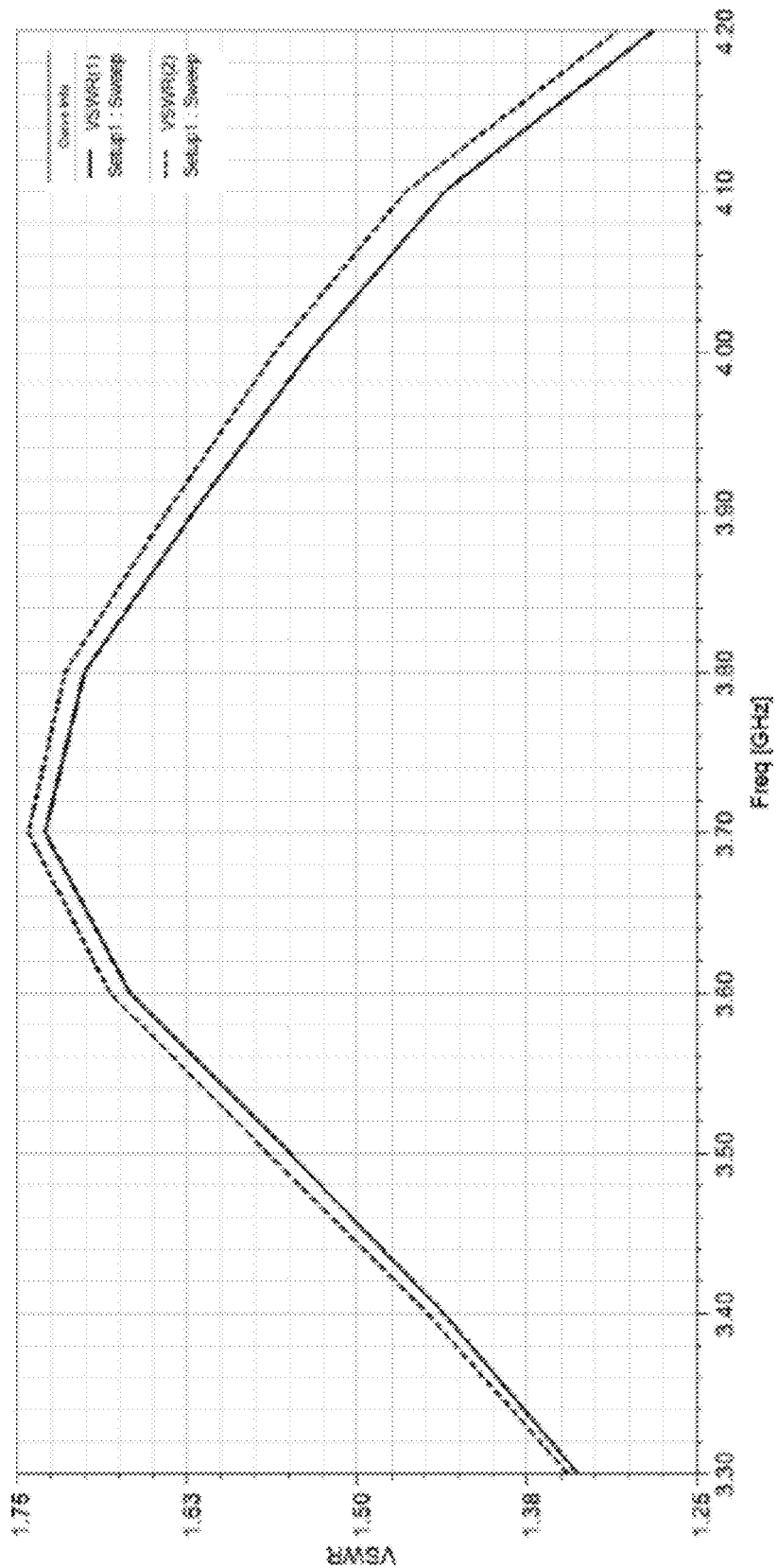
FIG. 9 is a schematic diagram illustrating a standing wave ratio of a transparent antenna in a free space according to an embodiment of the present disclosure.
Figure 10:
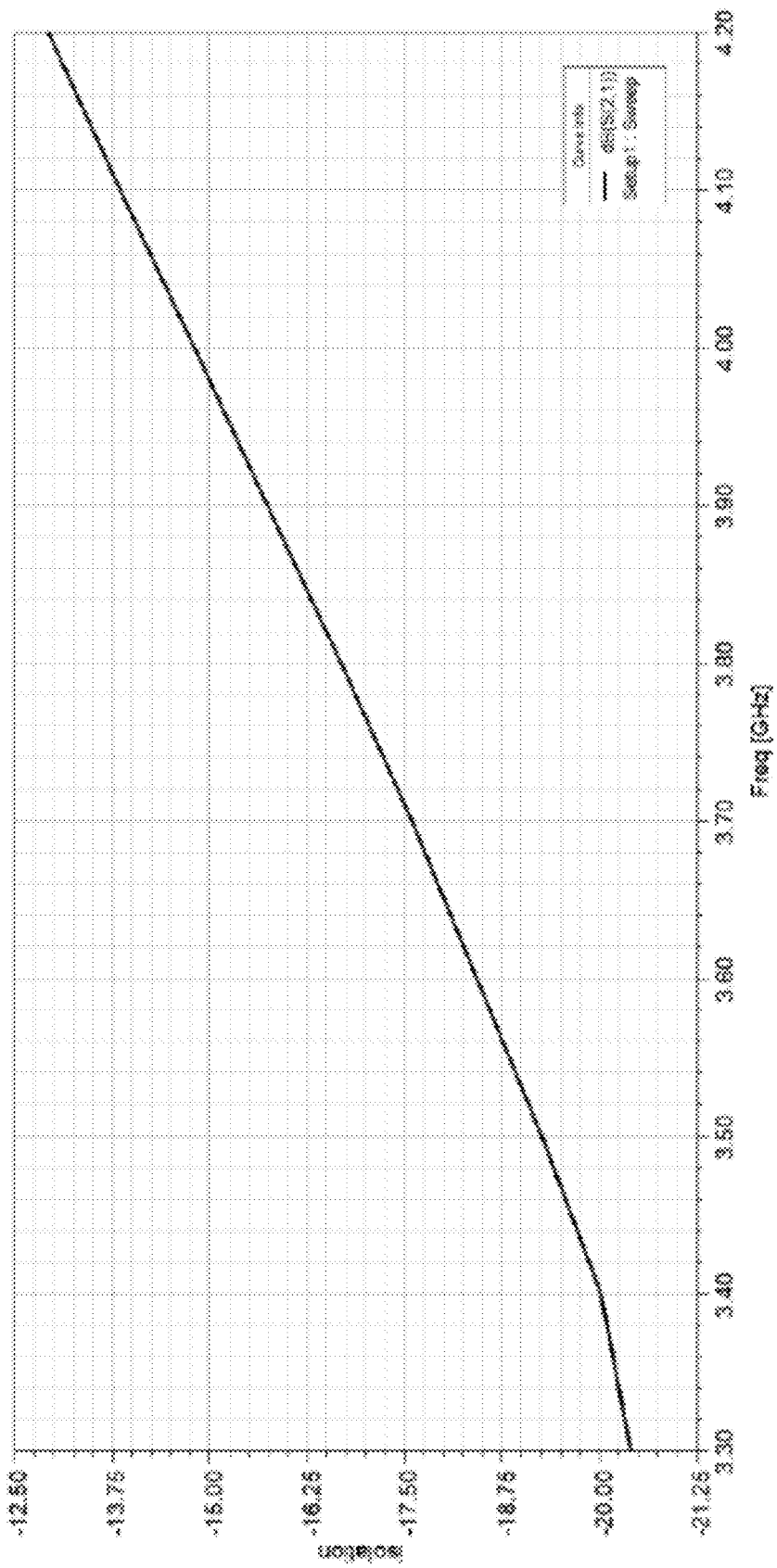
FIG. 10 is a schematic diagram illustrating an isolation of a transparent antenna in a free space according to an embodiment of the present disclosure.
Figure 11:
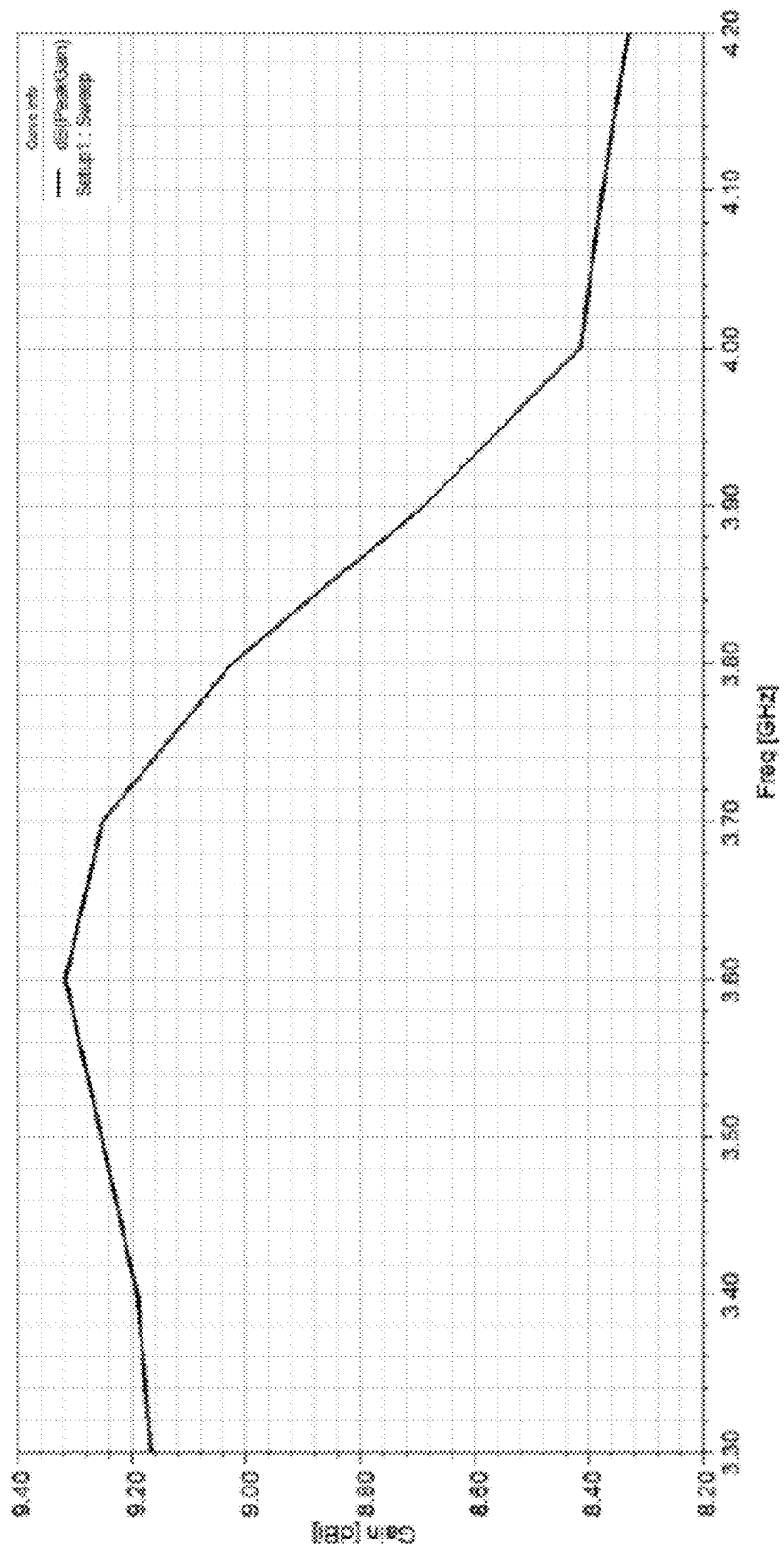
FIG. 11 is a schematic diagram illustrating a gain of a transparent antenna in a free space according to an embodiment of the present disclosure.
Figure 12:
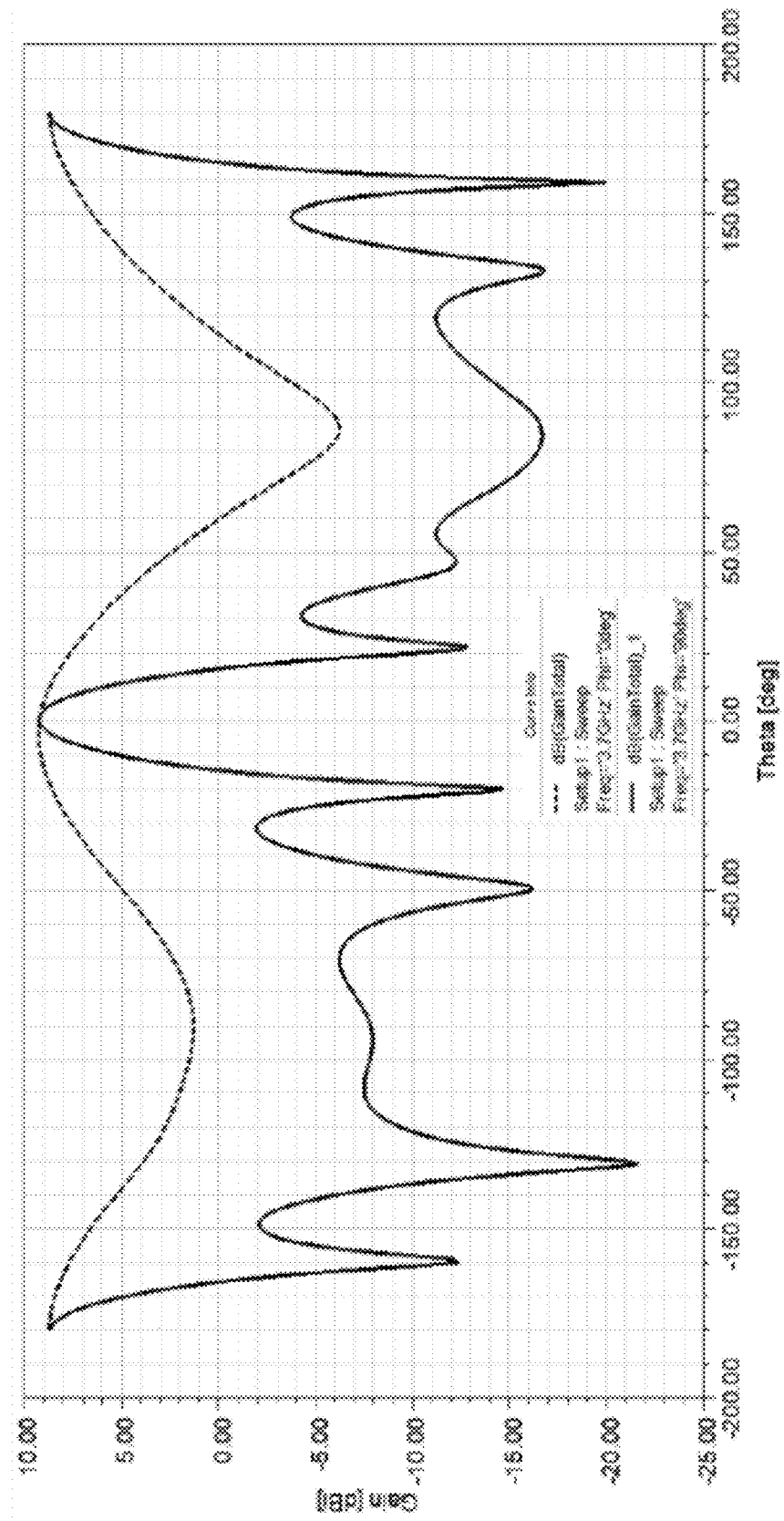
FIG. 12 is a schematic diagram illustrating beam widths of a transparent antenna in horizontal and vertical directions in a free space according to an embodiment of the present disclosure.

It can be seen from a simulation experiment for the transparent antenna that: FIG. 9 is a schematic diagram of a standing wave ratio of a transparent antenna in a free space according to an embodiment of the present disclosure. As shown in FIG. 9, the transparent antenna according to the embodiment of the present disclosure has a standing wave ratio characteristic of less than 1.75 in the N77 wave band. FIG. 10 is a schematic diagram of an isolation of a transparent antenna in a free space according to an embodiment of the present disclosure. As shown in FIG. 10, the transparent antenna according to the embodiment of the present disclosure has an isolation characteristic higher than 12.5 dB in the N77 wave band, which can improve crosstalk resistance of signals between ports. FIG. 11 is a schematic diagram of a gain of a transparent antenna in a free space according to an embodiment of the present disclosure. As shown in FIG. 11, the transparent antenna of the embodiment of the present disclosure has a gain characteristic in a range of 8.33 dBi to 9.17 dBi in the N77 wave band, which greatly improves the receiving sensitivity of the antenna. FIG. 12 is a schematic diagram illustrating beam widths of a transparent antenna in horizontal and vertical directions in a free space according to an embodiment of the present disclosure. As shown in FIG. 12, the transparent antenna according to the embodiment of the present disclosure has a horizontal beam width of 70° and a vertical beam width of 18° at the center frequency point. It can be seen that the transparent antenna has a wider signal coverage range in the horizontal direction, which is beneficial to the signal receiving range.

Figure 13:
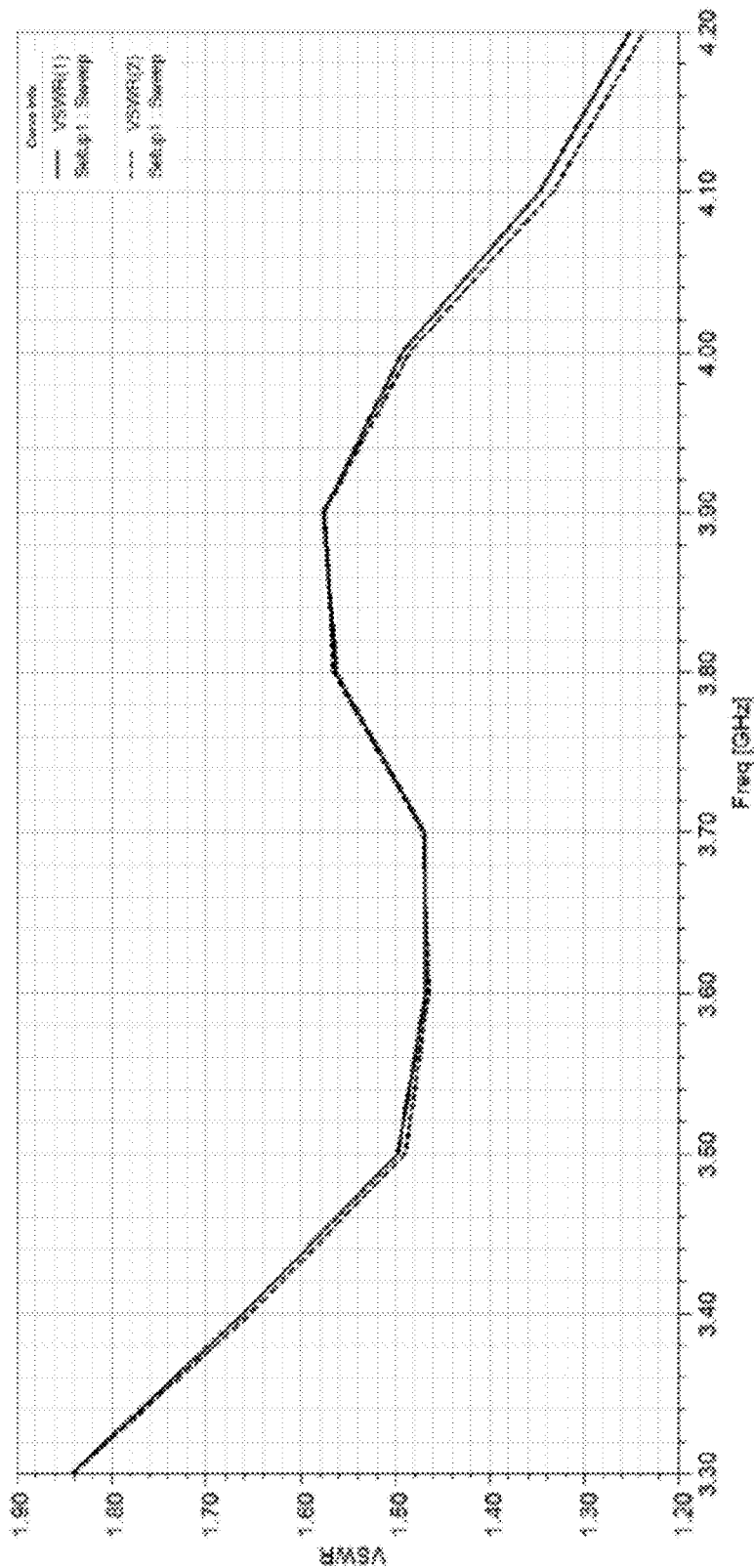
FIG. 13 is a schematic diagram illustrating a standing wave ratio of a transparent antenna attached to a glass window according to an embodiment of the present disclosure.
Figure 14:
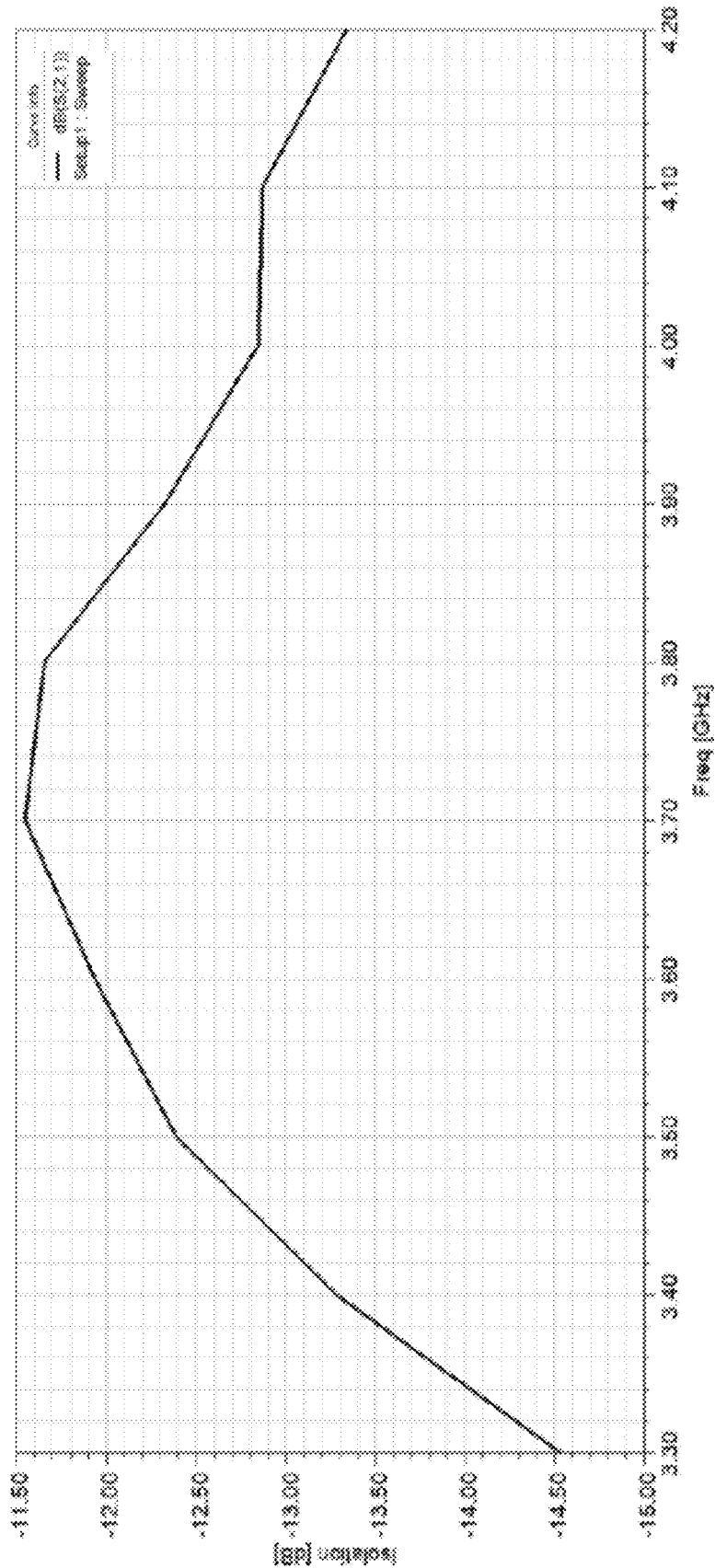
FIG. 14 is a schematic diagram illustrating an isolation of a transparent antenna attached to a glass window according to an embodiment of the present disclosure.
Figure 15:
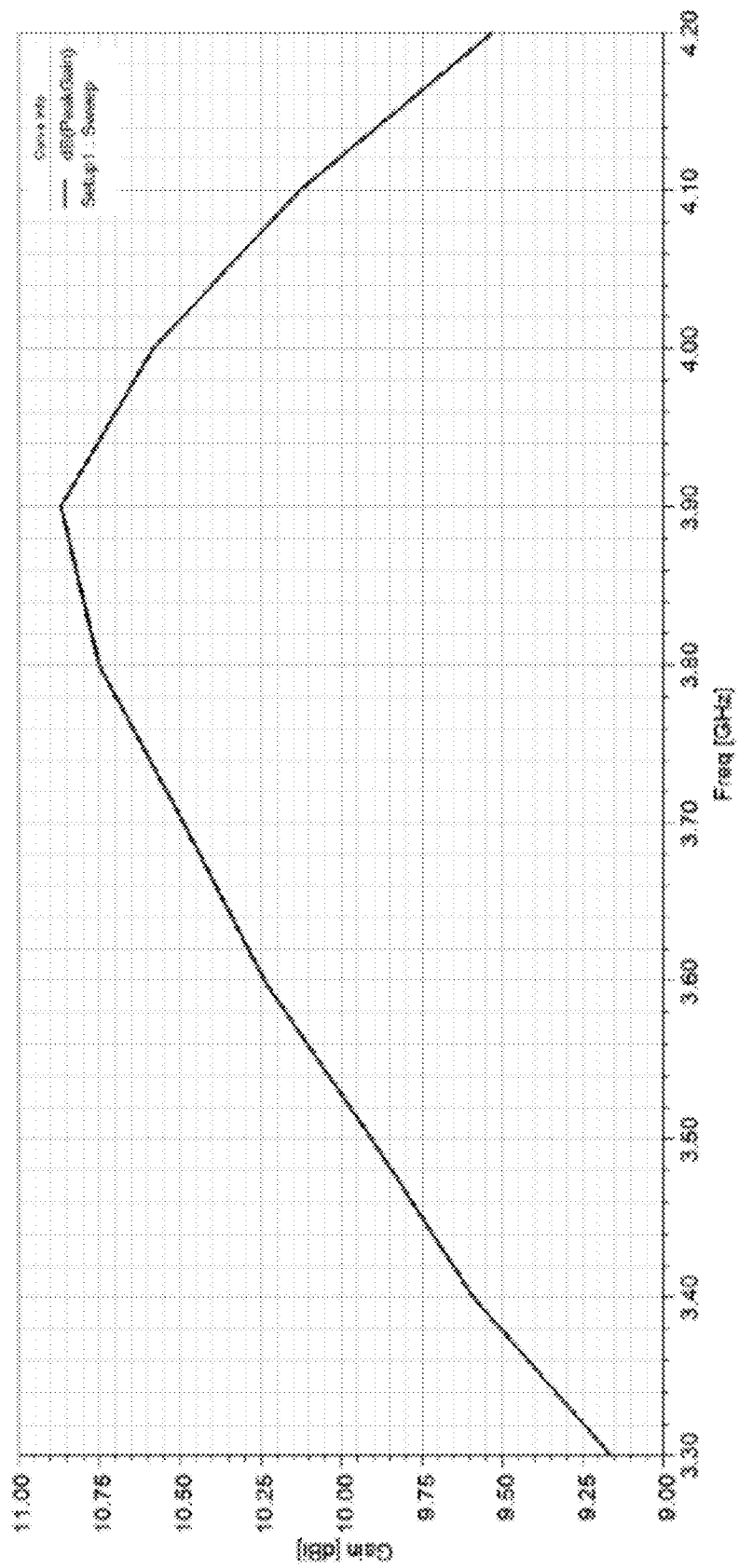
FIG. 15 is a schematic diagram illustrating a gain of a transparent antenna attached to a glass window according to an embodiment of the present disclosure.
Figure 16:
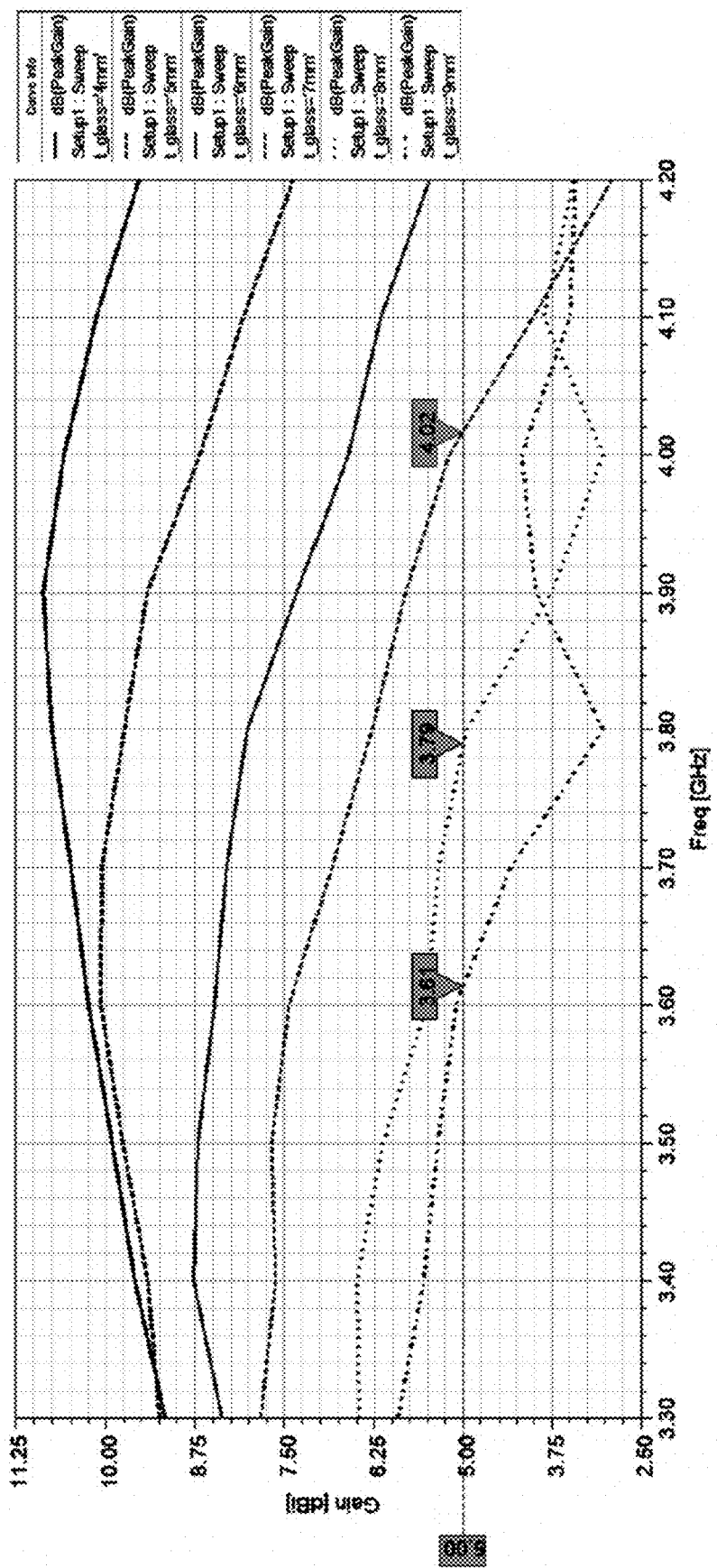
FIG. 16 is a schematic diagram illustrating gain changes of a transparent antenna attached to glass windows with different thicknesses according to an embodiment of the present disclosure.

The transparent antenna shown in FIG. 2 is attached to the inner side of the glass window, and the second conductive layer 3 of the transparent antenna is closer to the glass window than the first conductive layer 2. The glass window adopts single-layer glass and has a thickness of 4 mm, as an example. Due to the introduction of the glass, a large amount of electromagnetic energy is attracted by the glass with high dielectric constant, so that the energy radiated to the inner side of the glass by the antenna is reduced by 6 dB, and thus, a front-to-rear ratio characteristic of the antenna is improved. FIG. 13 is a schematic diagram of a standing wave ratio of a transparent antenna attached to a glass window according to an embodiment of the present disclosure. As shown in FIG. 13, the standing wave ratio of the transparent antenna of the embodiment of the present disclosure attached to the glass window is less than 1.9, and the transparent antenna still has a good matching performance. FIG. 14 is a schematic diagram of an isolation of a transparent antenna attached to a glass window according to an embodiment of the present disclosure. As shown in FIG. 14, the isolation of the transparent antenna of the embodiment of the present disclosure attached to the glass window is greater than 11.5 dB, which still maintains a higher isolation characteristic, that is, even if the transparent antenna is attached to the glass window, the transparent antenna still has a better crosstalk resistance of signals between the ports. FIG. 15 is a schematic diagram of a gain of a transparent antenna attached to a glass window according to an embodiment of the present disclosure. As shown in FIG. 15, the transparent antenna according to the embodiment of the present disclosure attached to the glass window has a gain characteristic in a range of 9.17 dBi to 9.53 dBi in the N77 wave band, and the gain of the transparent antenna is significantly improved due to the introduction of the glass as compared to FIG. 11. Especially under the frequency point of 3.9 GHz, the gain of the transparent antenna attached to the glass window is improved by 2.18 dB. FIG. 16 is a schematic diagram illustrating a gain variation of a transparent antenna attached to glass windows with different thicknesses according to an embodiment of the present disclosure. As shown in FIG. 16, the gain of the transparent antenna according to an embodiment of the present disclosure attached to the glass with a thickness not less than $0.09\lambda_h$ ($\lambda_n$ is the wavelength of the highest frequency point) can be maintained to be not less than dBi.

Figure 17:
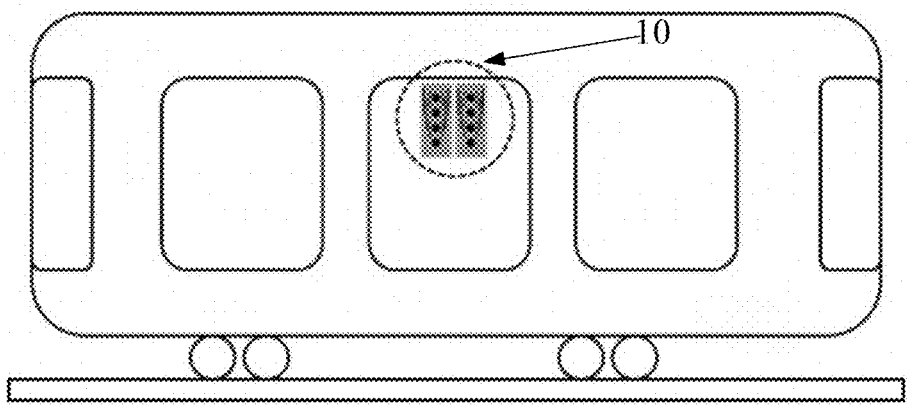
FIG. 17 is a schematic diagram of a transparent antenna mounted on a glass window according to an embodiment of the present disclosure.

In a second aspect, an embodiment of the present disclosure provides a communication system that may include the transparent antenna 10 described above, and the transparent antenna 10 may be fixed inside a glass window, as shown in FIG. 17.

A communication system in the embodiment of the present disclosure may be used in a glass window system for an automobile, a train (including a high-speed rail), an aircraft, a building, or the like. The transparent antenna 10 may be fixed inside of the glass window (a side closer to a room). Because the optical transmittance of the transparent antenna 10 is high, the transmittance of the glass window is not greatly affected while realizing the communication function of the transparent antenna 10, and such the transparent antenna 10 becomes a development trend for an aesthetic antenna. The glass window in the embodiments of the present disclosure includes, but is not limited to, double glass, or alternatively, single glass, laminated glass, thin glass, thick glass, or the like.

Figure 18:
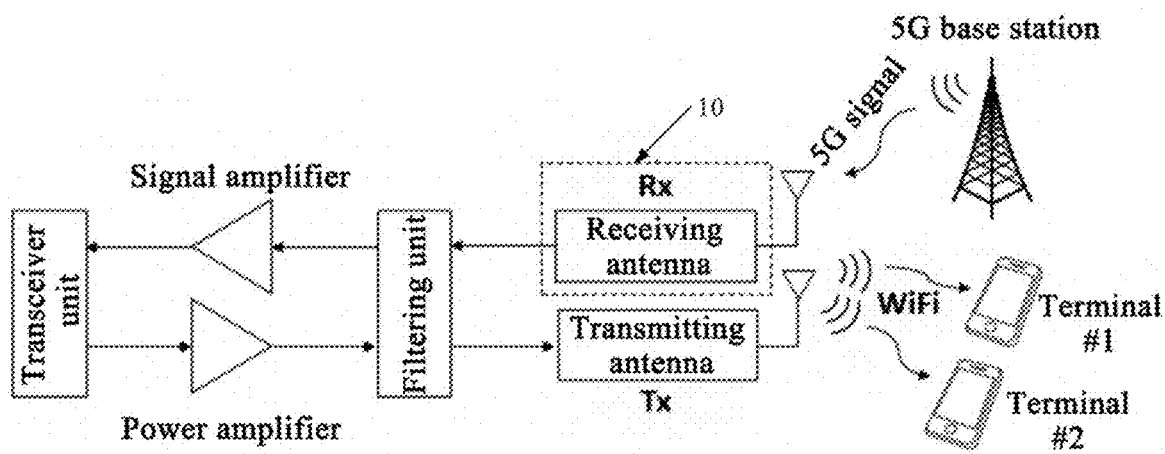
FIG. 18 is a schematic diagram of a communication system according to an embodiment of the present disclosure.

In some examples, FIG. 18 is a schematic diagram of a communication system according to an embodiment of the present disclosure. As shown in FIG. 18, the communication system provided by embodiments of the present disclosure further includes a transceiver unit, a radio frequency transceiver, a signal amplifier, a power amplifier, and a filtering unit. The transparent antenna in the communication system may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by the transparent antenna in the communication system and is processed by the filtering unit, the power amplifier, the signal amplifier, and the radio frequency transceiver (not shown in the drawings), the transparent antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the transparent antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the transparent antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one transparent antenna 10. In the process of transmitting signals by the communication system, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the transparent antenna, and the transparent antenna 10 radiates the signals. In the process of receiving signals by the communication system, the signals received by the transparent antenna 10 are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the transparent antenna 10. The signals received by the transparent antenna 10 are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the communication system provided by the embodiments of the present disclosure further includes a power management unit connected to the power amplifier and for providing the power amplifier with a voltage for amplifying the signal.

With reference to FIG. 18, the transparent antenna 10 in the embodiment of the present disclosure is used as a receiving antenna RX. The transparent antenna in the embodiment of the present disclosure filters and amplifies a 5G signal sent by a 5G base station, and converts the 5G signal into a Wi-Fi signal, and then the Wi-Fi signal is sent to a user terminal through a transmitting antenna TX.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A transparent antenna, comprising:
a dielectric layer comprising a first surface and a second surface opposite to each other in a thickness direction of the dielectric layer;
a first conductive layer on the first surface of the dielectric layer; wherein the first conductive layer comprises at least one first feed line and at least one second feed line; and
a second conductive layer on the second surface of the dielectric layer; wherein the second conductive layer comprises at least one first opening; wherein
an outline of an orthographic projection of each first opening on the dielectric layer intersects with an orthographic projection of each of a corresponding first feed line and a corresponding second feed line on the dielectric layer; and the orthographic projection of each of the first feed line and the second feed line on the dielectric layer extends into the orthographic projection of the corresponding first opening on the dielectric layer, and the at least one first feed line has a different feeding direction from the at least one second feed line.

2. The transparent antenna of claim 1, wherein at least one of the first conductive layer and the second conductive layer comprises a metal mesh structure.

3. The transparent antenna of claim 1, wherein the at least one first opening comprises a plurality of first openings, the at least one first feed line comprises a plurality of first feed lines, the at least one second feed line comprises a plurality of second feed lines, and the plurality of first feed lines and the plurality of second feed lines are in one-to-one correspondence with the plurality of first openings, respectively; centers of the plurality of first openings are on a straight line, and a line connecting the centers of the plurality of first openings is a first line segment; and the at least one first feed line and the at least one second feed line are symmetrically arranged with an extending line of the first line segment as a symmetry axis.

4. The transparent antenna of claim 1, wherein each first opening has a parallelogram in outline; an intersection between the orthographic projections of the first feed line and the first opening corresponding to each other on the dielectric layer is a first intersection, and an intersection between the orthographic projections of the second feed line and the first opening corresponding to each other on the dielectric layer is a second intersection; and
for an orthographic projection of any first opening on the dielectric layer, a connecting line between the first intersection and the second intersection is parallel to a diagonal line of the first opening.

5. The transparent antenna of claim 4, wherein the connecting line between the first intersection and the second intersection is a second line segment; and a ratio of a length of the second line segment to a length of the diagonal line of the first opening parallel to the second line segment is in a range of 0.4 to 0.9.

6. The transparent antenna of claim 1, wherein a portion of an orthographic projection of each of the first feed line and the second feed line on the dielectric layer, within the orthographic projection of the corresponding first opening on the dielectric layer, has a line length of $\frac{1}{4}\lambda$.

7. The transparent antenna of claim 1, wherein at least one of the first feed line and the second feed line is a micro-strip line, and a feeding direction of one of the first feed line and the second feed line is a vertical direction, and a feeding direction of the other one of the first feed line and the second feed line is a horizontal direction.

8. The transparent antenna of claim 1, further comprising: a first feed structure and a second feed structure both on the second surface of the dielectric layer, wherein the first feed structure is electrically connected to the at least one first feed line, and the second feed structure is electrically connected to the at least one second feed line.

9. The transparent antenna of claim 1, further comprising: a first feed structure and a second feed structure both in the first conductive layer, wherein the first feed structure is electrically connected to the at least one first feed line, and the second fer structure is electrically connected to the at least one second feed line.

10. The transparent antenna of claim 9, wherein the at least one first opening comprises $2^n$ first openings, the first feed structure comprises n stages of third feed lines, the second feed structure comprises n stages of fourth feed lines;
one third feed line at a $1^{st}$ stage is connected to two adjacent first feed lines, and different third feed lines at the $1^{st}$ stage are connected to different first feed lines; one third feed line at an $m^{th}$ stage is connected to two adjacent third feed lines at an $(m-1)^{th}$ stage, and different third feed lines at the $m^{th}$ stage are connected to different third feed lines at the $(m-1)^{th}$ stage;
one fourth feed line at a $1^{st}$ stage is connected to two adjacent second feed lines, and different fourth feed lines at the $1^{st}$ stage are connected to different second feed lines; one fourth feed line at an $m^{th}$ stage is connected to two adjacent fourth feed lines at an $(m-1)^{th}$ stage, and different fourth feed lines at the $m^{th}$ stage are connected to different fourth feed lines at the $(m-1)^{th}$ stage; where $n \geq 2$, $2 \leq m \leq n$, and both m and n are integers; and
at least one of the third feed line and the fourth feed line is a micro-strip line.

11. The transparent antenna of claim 10, further comprising: a first connector and a second connector; wherein the first connector is electrically connected to an $n^{th}$ stage of the third feed lines; and the second connector is electrically connected to an $n^{th}$ stage of the fourth feed lines.

12. The transparent antenna of claim 1, wherein the dielectric layer is a single layer structure and is made of polyimide or polyethylene terephthalate.

13. The transparent antenna of claim 1, wherein the dielectric layer comprises a first dielectric sub-layer, a first adhesive layer and a second dielectric sub-layer, which are stacked together; and the first conductive layer is on a side of the first dielectric sub-layer away from the first adhesive layer; and the second conductive layer is on a side of the second dielectric sub-layer away from the first adhesive layer.

14. The transparent antenna of claim 13, wherein a material of the first dielectric sub-layer and/or the second dielectric sub-layer comprises polyimide or polyethylene terephthalate.

15. The transparent antenna of claim 1, wherein the dielectric layer comprises a first dielectric sub-layer, a first adhesive layer, a support layer, a second adhesive layer, and a second dielectric sub-layer, which are stacked together; the first conductive layer is on a side of the first dielectric sub-layer away from the first adhesive layer; the second conductive layer is arranged on a side of the second dielectric sub-layer away from the second adhesive layer.

16. The transparent antenna of claim 15, wherein a material of the support layer comprises any one of polycarbonate plastic, cycloolefin polymer plastic, or acrylic/polymethyl methacrylate.

17. The transparent antenna of claim 15, wherein a material of the first dielectric sub-layer and/or the second dielectric sub-layer comprises polyimide or polyethylene terephthalate.

18. The transparent antenna of claim 1, further comprising a housing; wherein the dielectric layer is arranged within a hollow space of the housing.

19. A communication system, comprising the transparent antenna of claim 1.

20. The communication system of claim 19, further comprising:

a transceiver unit configured to transmit or receive a signal;

a radio frequency transceiver connected to the transceiver unit and configured to modulate the signal transmitted by the transceiver unit or demodulate a signal received by the transparent antenna and then transmit the signal to the transceiver unit;

a signal amplifier connected to the radio frequency transceiver and configured to improve a signal-to-noise ratio of the signal transmitted by the radio frequency transceiver or the signal received by the transparent antenna;

a power amplifier connected to the radio frequency transceiver and configured to amplify a power of the signal transmitted by the radio frequency transceiver or the signal received by the transparent antenna; and a filtering unit connected to the signal amplifier, the power amplifier and the transparent antenna, and configured to filter a received signal and then transmit the filtered signal to the transparent antenna or filter the signal received by the transparent antenna.

* * * * *